United States Patent
Rizkin et al.

[11] Patent Number: 6,155,703
[45] Date of Patent: Dec. 5, 2000

[54] SURFACE MOUNTED LIGHT ASSEMBLY

[75] Inventors: Alexander Rizkin, Redondo Beach; Robert H. Tudhope, Rancho Palos Verdes; David Ruiz, Redondo Beach; Yevgeniy Durets, Long Beach, all of Calif.

[73] Assignee: Physical Optics Corporation, Torrance, Calif.

[21] Appl. No.: 09/167,024

[22] Filed: Oct. 6, 1998

[51] Int. Cl.[7] .................................................. F21V 7/04
[52] U.S. Cl. ..................... 362/551; 362/554; 362/558; 362/576; 362/282; 385/901; 349/64
[58] Field of Search ..................... 362/554, 551, 362/558, 556, 576, 560, 583, 153.1, 153, 282, 284, 322, 324; 385/901; 349/64

[56] References Cited

U.S. PATENT DOCUMENTS

| | | | |
|---|---|---|---|
| 4,141,058 | 2/1979 | Mizohata | 362/558 |
| 5,418,420 | 5/1995 | Roberts | 362/297 |
| 5,436,806 | 7/1995 | Kato | 362/459 |
| 5,479,276 | 12/1995 | Herbermann | 349/61 |
| 5,629,996 | 5/1997 | Rizkin et al. | 385/31 |
| 5,785,410 | 7/1998 | Branson, Sr. | 362/153.1 |
| 5,951,144 | 9/1999 | Gavigan et al. | 362/153 |

*Primary Examiner*—Darren Schuberg
*Assistant Examiner*—Fayez Assaf
*Attorney, Agent, or Firm*—Nilles & Nilles, S.C.

[57] ABSTRACT

Surface light assemblies are disclosed that are particularly useful as edge light assemblies for illuminating the outer boundaries of a deck of a ship or a heliport and as line-up light assemblies for illuminating a path on a surface such as a ship deck, a runway or the like. The light assembly includes a fiber optic cable connected to the bottom of a housing or enclosure which distributes light from a terminal end of the cable. The terminal end may include a transformer which produces a particular spread or cone of a light output pattern. Alternatively, a diffuser or optical element may be placed directly adjacent the terminal end of the cable or transformer which shapes, directs and homogenizes light emanating from the cable. The light assembly can include a durable glass window which protects the diffuser and cable and which can be adapted to filter out certain wavelengths of light producing a light output in a desired color. Such a construction is particularly useful for deck edge lighting. Alternatively, the light may be aimed or directed by a reflective surface directly toward a particular location in a specified narrow pattern. Such a construction is particularly useful for line-up light assemblies.

10 Claims, 3 Drawing Sheets

SURFACE MOUNTED LIGHT ASSEMBLY

BACKGROUND OF THE INVENTION

1. Field of the Invention

The present relates generally to surface or deck mounted light assemblies, and more particularly to edge lights and line-up lights for illuminating the deck of a ship, a side of a ship, a runway, or the like.

2. Description of the Related Art

Lights and line-up lights are known in the art for use on ship decks and for other areas of illumination such as airport runways, heliports and the like. A typical ship deck edge light construction includes a light source or bulb connected to a remote source of electrical energy for illuminating the bulb. The bulb is held in a primary housing that is set recessed or flush with the surface of a deck or side of a ship or other such surface. The bulb is covered by a metal grating raised above the surface and has a slightly convex or domed shape. The metal grating typically is secured by a plurality of fasteners to the primary housing.

The optical qualities and characteristics of such a construction are arcane wherein much of the energy produced by the bulb is lost or absorbed by the components of the structure and not emitted outward above the mounting surface. Additionally, the grating structure is relatively heavy, expensive to manufacture and requires labor in order to install. A further disadvantage of such a construction is that the grating structure protrudes upward from the surface and causes somewhat of an obstruction and a hazard for objects and individuals passing along the surface.

A typical line-up light construction includes a primary housing structure having a domed top surface projecting outward or upward from a deck surface of a ship, runway surface or the like. A light bulb is held within a cavity of the domed structure and is illuminated by a remote source of electrical energy or power. The enclosing structure includes a small opening and a depression or recessed channel having a particular tapered configuration that permits the bulb or light source to be viewed only from a particular angle and orientation relative to the line-up light assembly.

One disadvantage of such a construction is that most of the light energy produced by the bulb held within the enclosure is absorbed by the structure itself and not utilized for illumination purpose for which it was intended. An additional disadvantage of such a construction is that the optical qualities or characteristics are very poor in that the light distribution is controlled only by the size, shape and contour of the opening and the recessed channel in the enclosure. A further disadvantage of such a construction is that the optical qualities are permanent and not adjustable.

SUMMARY OF THE INVENTION

The present invention is directed to an improved construction for surface light assemblies including an edge light and a surface line-up light wherein the edge light and line-up light have more sophisticated and improved optical qualities and characteristics and provide more efficient lighting.

One object of the present invention is to provide an edge light assembly that lies flush with a surface of a ship deck or other such surface into which it is recessed. Another object of the present is to provide a deck edge light assembly which produces a light output pattern that is essentially identical to that of prior constructions even though the light assembly is recessed and flush with the surface into which it is installed. A further object of the present invention is to provide a deck light assembly which has improved efficiencies and is simpler to manufacture and install.

Another object of the present invention is to provide a line-up light assembly for a ship deck, airport runway or the like that has vastly improved optical characteristics. An additional object of the present invention is to produce a line-up light assembly wherein the light output directionality is adjustable.

A still further object of the present invention is to provide such light assemblies that are much more efficient and either produce the same amount of light energy as prior constructions utilizing less input energy or produce greater amounts of light energy while utilizing no additional energy than prior constructions. A still further object of the present invention is to provide such light assemblies utilizing fiber optic cables in order to deliver light energy to the light assemblies from a remote light source.

To accomplish these and other objects, features and advantages of the present invention, an edge lighting assembly is provided having a housing with a cavity defined therein. A fiber optic cable bundle is connected to a lower end of the housing and enters the cavity. The cable bundle has a terminal end which is adjacent a diffuser element supported within the cavity. The diffuser element is adapted to shape, direct and homogenize light passing through the element. A sturdy, transparent window layer is disposed over the diffuser to provide protection for the diffuser element and cable bundle. The window layer may also be adapted to filter out particular wavelengths of light in order to produce a light output of a desired color. The housing and transparent window layer are recessed, flush mounted and parallel to a surface into which the assembly is installed.

In one embodiment, a line-up light assembly includes an enclosure having a domed upper surface, a lower surface and an internal cavity defined therebetween. A fiber optic cable bundle is connected to the lower surface of the enclosure and has a light transformer at the end of the cable bundle which extends into the cavity. A rotateable mirror is disposed within the cavity and defines a reflective plane that faces the light transformer. The mirror is rotateable about a pivot axis transverse relative to the reflective plane. An adjustment mechanism is connected to a portion of the mirror and manipulates the rotational position of the mirror about the pivot axis in order to adjust a light output pattern emanating from the light assembly.

These and other objects, features and advantages of the present invention will become apparent when considered in conjunction with the following description and accompanying drawings. It should be understood, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided within the present invention, will become more readily apparent by referring to the exemplary, and therefore non-limiting, embodiments illustrated in the drawings accompanying and forming a part of this specification, wherein like reference numerals designate like elements, and in which.

DETAILED DESCRIPTION OF THE PREFERRED EMBODIMENTS

Figure 1:
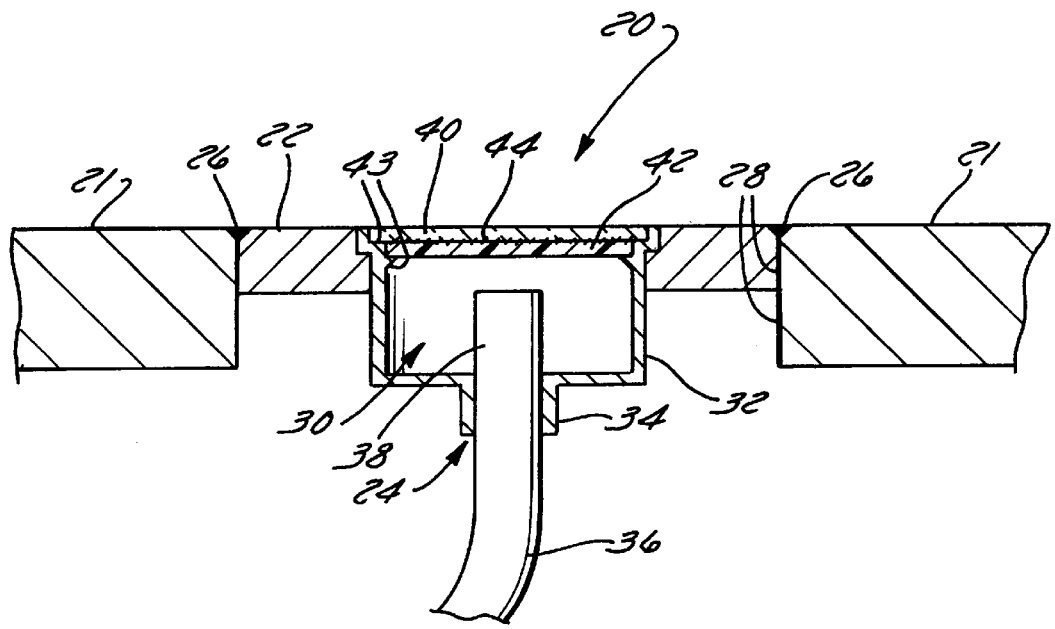
FIG. 1 illustrates a cross-sectional side view of an edge light assembly installed in a deck surface of a ship and constructed in accordance with the present invention.
Figure 2:
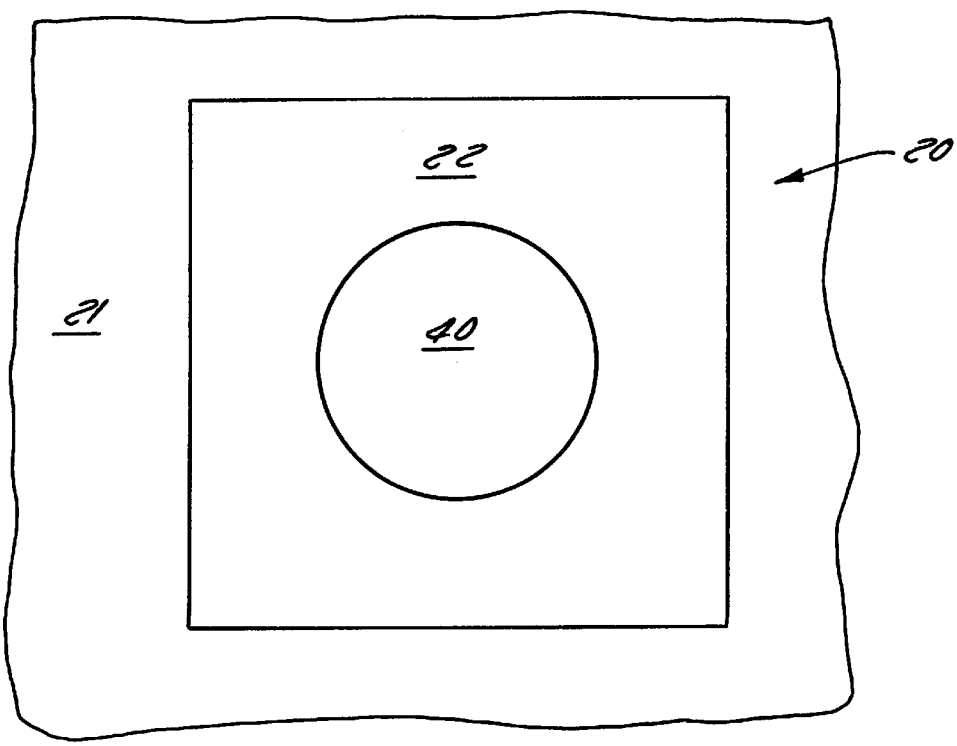
FIG. 2 illustrates a top plan view of the edge light assembly shown in FIG. 1.

Referring now to the drawings, FIGS. 1 and 2 illustrate a novel construction for an edge light assembly 20 recessed in and mounted to a deck surface of 21 of a ship or the like. The surface 21 may also be a flat ground surface such as an airport runway, a parking lot or a decorative or landscaped surface for a campus or other such environment. The edge light assembly 20 also includes a weld plate 22 supporting a housing assembly 24 below the surface 21.

The weld plate 22 in the present embodiment is welded at a weld joint 26 between the deck surface and the weld plate 22. The weld plate 22 includes an opening 28 in which the housing assembly 24 is supported by the weld plate. The weld plate may be replaced by other types of flat support elements where the ground surface is not a metal deck surface. The support elements must securely support the housing 24 in the mounting surface and be capable of being securely held in the ground surface such as asphalt, concrete or the like. The invention is not to be limited to only metal deck surfaces.

The housing assembly 24 is in the form of a circular cylinder in the present embodiment and defines a housing cavity 30 within a cylindrical wall 32. A smaller diameter cylindrical extension extends downwardly from the housing 24 defining a support shoulder or collar 34 through which an optical fiber cable bundle 36 extends into the cavity 30 of the housing 24. The cable bundle 36 includes a terminal end 38 facing upward toward the top end of the cylindrical wall 32. The housing 24 may be formed from sheet metal or cast from other metal materials. Alternatively, the housing 24 may be molded from thermoplastic materials or the like. The particular construction and material of the housing 24 may take on any number of various alternatives and yet remain within the scope of the invention.

A dual layer transparent assembly is disposed over the top end of the cylindrical wall 32 and includes a top layer in the form of a sapphire window 40 which is light transparent and yet extremely sturdy and durable. The sapphire window may also be adapted to filter certain light wavelengths in order to produce a desired output color such as red. Attached beneath the sapphire window 40 is a light shaping optical structure in the form of a diffuser 42. The diffuser 42 may be produced on the base surface of the sapphire window 40, or may be adhered to the sapphire window 40 along an abutting surface by an optical quality epoxy 44. Very little, if any, of the light emanating from the terminal end 38 of the optical fiber cable 36 will be absorbed by the epoxy 44 or reflected back by the refractive abutting surface defined between the sapphire window 40 and the diffuser 42. Alternatively, the sapphire window 40 and diffuser 42 may be supported on separate shoulders 43 of the housing as shown in FIG. 1 without being attached to one another.

Figure 3:
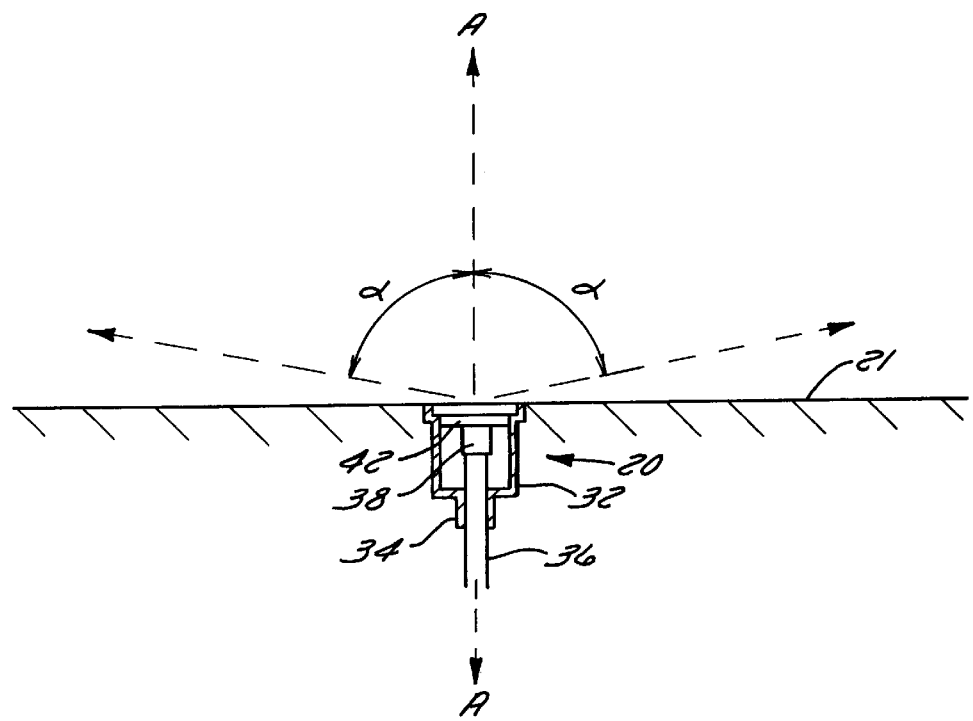
FIG. 3 illustrates a schematic view of one embodiment of a light distribution pattern emanating from the edge light assembly of FIGS. 1 and 2.

The diffuser is preferably constructed in order to control the directionality, improve the homogeneity, and shape the light passing through the diffuser to the sapphire window 40. Depending upon the particular construction of the diffuser, many different particular light output characteristics are possible. FIG. 3 illustrates one embodiment of a possible light output from the deck light assembly 20. Deck edge lights typically require an azimuth coverage of 360° relative to a vertical axis "A" and therefore can be viewed from essentially any angle around the light assembly. The elevational coverage for a deck edge light assembly typically requires that the light emanate having a spread of about 90° relative to the vertical axis "A" and the horizontal axis defined by the surface 21 in any direction about the axis "A". Therefore, the cone of light of an ideal edge light for a ship is in the form of an infinite half sphere.

Light output from the terminal end 38 of the cable bundle 36 depends on the refractive index of both the core and cladding of the optical fiber and has, for example, a conical spread of a solid angle of about 30°, for PMMA material. The diffuser 42 can be provided capable of producing a light output having an azimuth coverage of 360° about the vertical axis "A." Additionally, the diffuser 42 can easily further bend the light from the terminal end 38 of the cable on the order of ±80°. Thus, the light output created by the diffuser can produce an elevational coverage well beyond the 90° needed according to the angle (in FIG. 3). The diffuser 42 therefore can be tailored to further diffuse the light from the cable 36 in order to produce the desired elevational coverage.

One advantage of the deck edge light assembly 20 is that essentially all of the light exiting the terminal end 38 from the cable bundle 36 is directed toward the diffuser 42. The diffuser 42 then further passes virtually all of the light therethrough and shapes and directs the light. Very little if any light energy need be wasted which is a vast improvement over prior art deck edge constructions. A further advantage of the present invention is that the deck edge light assembly is flush mounted and therefore essentially parallel with the surface 21 to which it is mounted. Prior constructions include a metal grating to protect the light assembly which extends upward from the surface. Additionally, the grating adds weight, cost, component complexity, and installation complexity each of which is improved by the present invention. In contrast with prior constructions, the present invention does not have any active elements in the housing and therefore requires no maintenance.

Figure 4:
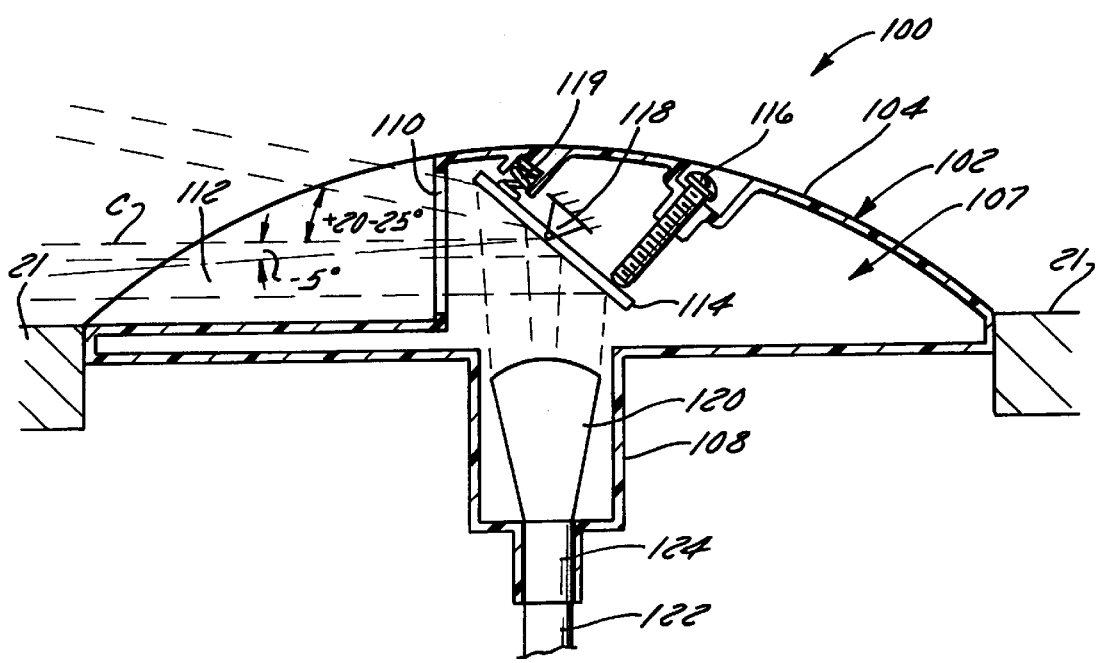
FIG. 4 illustrates a cross-sectional side view of one embodiment of a line-up light assembly installed in a deck surface of a ship and constructed in accordance with the present invention.
Figure 5:
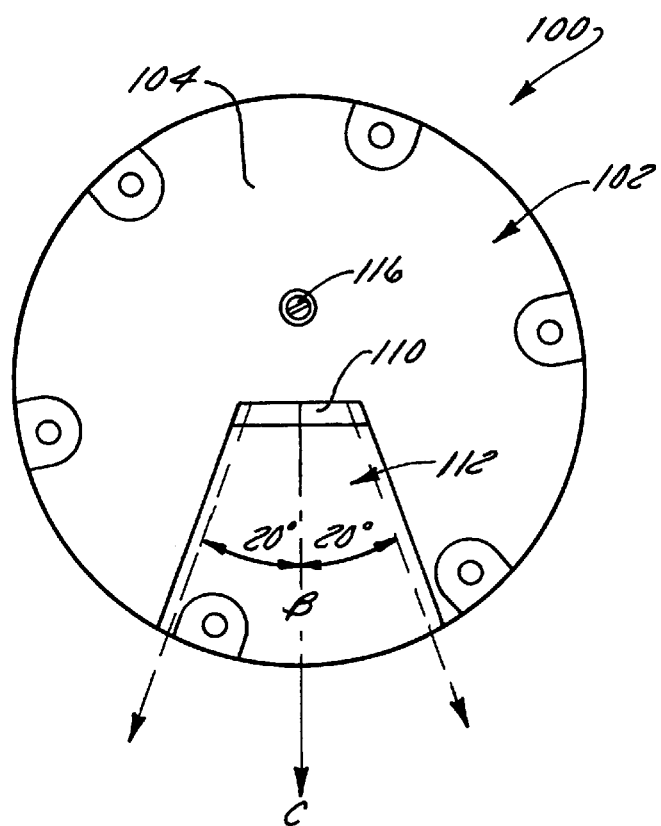
FIG. 5 illustrates a top plan view of the line-up assembly of FIG. 4 and a schematic view of one embodiment of a light distribution pattern emanating from the line-up light assembly.
Figure 6:
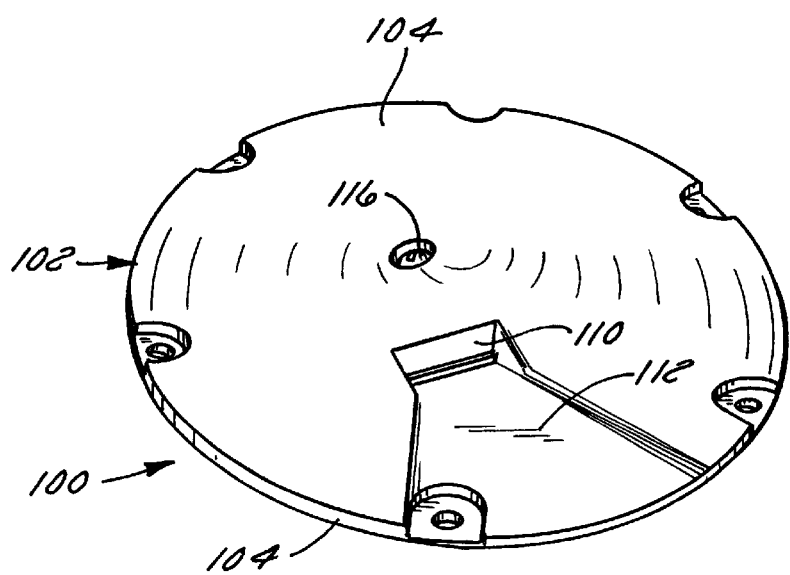
FIG. 6 illustrates an elevational perspective view of the line-up light assembly of FIG. 4.

Referring now to FIGS. 4–6, a novel line-up light assembly 100 constructed according to the present invention is illustrated mounted to a ship deck surface 21. The assembly 100 includes an enclosure 102 having an upper domed section 104 and a lower flat surface 106 beneath the domed section 104. A cavity 107 is defined within the domed section 104 and lower surface 106. A support shoulder 108 projects downward from the generally flat surface 106. The domed section 104 includes an opening or window 110 through which light is projected from the cavity 107 of enclosure 102. The opening 110 faces toward a recessed channel 112 set into the domed section 104 of the enclosure 102 which permits light to exit the enclosure without obstruction. The recessed section 112 is shown in the present embodiment as a tapered angled recess wherein the angle of the taper generally follows the contour of the predetermined light output described below.

The enclosure 102 of the present invention may be molded from thermoplastic materials or may be made from metals and assembled. The enclosure 102 may take on many configurations and constructions and be made from many different materials without departing from the scope of the invention.

Also disposed within the cavity 107 of the domed section 104 is a tiltable reflective surface or mirror 114 which is adjustable by an adjustment mechanism 116. If the adjustment mechanism 116 is moved in one direction a portion of the mirror 114 is pushed downward. If the mechanism is moved in another direction the mirror is biased upward changing the angle of the mirror. The mirror 114 rotates about a pivot 118 supported by a portion of the enclosure 102. The mirror may be biased by a spring 119 or other biasing element toward one position and wherein the adjustment mechanism 116 utilized to move the mirror 114 toward another position. Alternatively, the adjustment mechanism 116 may be affixed to a portion of the mirror 114 so that movement of the adjustment mechanism positively moves the mirror position 114. The present embodiment shows a screw as the adjustment mechanism 116 although other mechanisms may be utilized without departing from the scope of the invention.

Securely held within the support shoulder 108 is a non-imaging light transformer 120 which directs light emanating from a fiber optic cable bundle 122 in a particular pattern. The function of the light transformer 120 is to reduce ("transform") the divergence angle of the light emerging from the optical fiber 122 to a value that is appropriate for optimal performance in a particular application.

The principle of operation of a non-imaging light transformer is based on the optical "etendu" principle, which states that the product of the area and the square of the sine of the divergence angle is a constant (known as the Liouville invariant) in a closed non-absorbing optical system:

$$A \sin^2\theta_1 = a \sin^2\theta_2,$$

where A and a are the areas of the optical beam, and $\theta_1$ and $\theta_2$ are the divergence angles of the beam at any two points along its propagation path. The basic surface contour used in non-imaging optics is that of a parabola. However, in cases with narrow divergence angles, a combination of a lens and a modified (hyperbolic/parabolic) surface contour can be used to reduce the length. For certain geometries, a simple conical surface can be substituted for the hyperbola/parabola contour with minimal loss in collection efficiency.

The light transformer is fabricated from optical grade clear plastic-acrylic or other polymethyl-methacrylate (PMMA) material. Depending upon the required surface accuracy, four manufacturing techniques can be used in production of a transformer: machining, thermoforming, casting, and injection molding.

Preferably, the transformer 120 produces a cone shaped light output having a solid angle smaller than that of the optical fiber 122, such as from several degrees to 25°–30° according to the particular application. The position of the mirror 114 can be adjusted to direct the cone of light in any particular direction within the limits of the permissible angular movement of the mirror. Flight deck lighting fixtures utilized for line-up lights typically require an azimuth coverage or width of about ±20° from a central axis "C" as illustrated in FIG. 5 and an elevational coverage of about −5° relative to a horizontal plane and about +20° to 25° relative to the horizontal plane. Depending upon the particular elevational coverage required, the non-imaging transformer 120 can be designed to produce the desired light angle output. Additionally, the non-imaging transformer 120 can produce the desired azimuth coverage as well. The mirror is adjustable in order to direct the light in the required direction, for example the −5° and +20–25° relative to the horizontal plane.

The fiber optic cable can include the non-imaging transformer connected directly to one distal end of the cable and a connector 124 utilized to support and align the cable and transformer in the proper position within the support shoulder 108. Alternatively, the end of the optical cable 122 may be supported by the connector 124 adjacent a transformer 120 already held within the enclosure.

One advantage of the line-up light assembly 100 of the present invention is that it produces a directed light pattern only toward the intended target and eliminates large amounts of wasted light when compared to prior art constructions. In the prior art, a shell or enclosure typically has an opening with a recess similar to that of 110 and 112, respectively, but a light bulb is simply held within the enclosure shining light in every direction wherein only light visible through the opening is actually useful for the purpose of illuminating a runway or the like.

A further advantage of the present invention is that the construction 100 is much more efficient in that most of the light is not wasted. Additionally, the present invention produces an adjustable directionality for the light assembly wherein the prior constructions are non-adjustable. A further advantage of the present invention is that the line-up light assembly 100 is much more efficient than prior known constructions in that virtually all of the light emanating from the optical cable 122 and the transformer 120 is utilized and not lost within the enclosure 102 or absorbed by components of the assembly. Therefore, either more light will emanate from a structure utilizing the same amount of energy as prior constructions or the same amount of light emanating from prior constructions may be produced by the construction of the present invention utilizing less power.

In each of these embodiments, the fiber optic cable bundle 122 and 36 was connected at its opposite end (not shown) to a light source position remote from the structures 120. Such systems are generally known in the art.

Though the invention has been described referring to particular embodiments, many other changes and modifications may be made to the invention as described without departing from the spirit and scope thereof. The scope and spirit of these changes will become apparent from the appended claims. The scope of the invention is therefore intended only to be limited by the appended claims.

What is claimed is:

1. An edge light assembly comprising:

a housing having a cavity defined therein;

a fiber optic cable bundle connected to a lower end of the housing, the cable bundle having a terminal end;

a diffuser element disposed adjacent the terminal end and adapted to shape, homogenize, and adjust an angle of light passing therethrough;

a transparent window layer disposed over the diffuser to filter out particular wavelengths of light in order to produce a light output having a desired color; and a support element connected to the housing to securely mount the housing in a surface, wherein the housing and the transparent window layer are flush and parallel to the surface.

2. The assembly of claim 1, wherein the transparent window layer comprises a sapphire window.

3. The assembly of claim 1, wherein the assembly is configured to be mounted in at least one of a deck of a ship, a side of a ship, and a runway.

4. The assembly of claim 1, wherein light passing through the diffuser is shaped so as to be symmetrical about a vertical axis.

5. A line-up light assembly comprising:
- an enclosure having an upper domed surface, a lower surface, and an internal cavity, wherein a recessed channel is formed in the upper domed surface through which light is emitted;
- a fiber optic cable bundle connected to the lower surface of the enclosure, the cable bundle having a light transformer extending into the cavity of the enclosure;
- a rotateable mirror disposed within the cavity and defining a reflective plane facing the light transformer, the mirror rotateable about a pivot axis transverse relative to the reflective plane; and
- an adjustment mechanism connected to a portion of the mirror for manipulating the rotational position of the mirror.

6. The assembly of claim 5, wherein the transformer is a non-imaging light transformer that is configured to reduce a divergence angle of light that exits the fiber optic cable bundle.

7. The assembly of claim 5, wherein the mirror is configured to be manipulated to direct light passing through the assembly within the range of approximately −5° and 25° relative to a horizontal plane.

8. An edge light assembly comprising:
- a housing having a cavity defined therein;
- a fiber optic cable bundle connected to a lower end of the housing, the cable bundle having a terminal end;
- a diffuser element disposed adjacent the terminal end, wherein light exiting the terminal end passes through the diffuser;
- a transparent window layer disposed over the diffuser to filter out particular wavelengths of light in order to produce a light output having a desired color; and
- a support element connected to the housing to securely mount the housing in a surface, wherein the housing and the transparent window layer are flush and parallel to the surface and wherein the assembly is configured to be mounted in the surface of at least one of a deck of a ship, a side of a ship, and a runway.

9. A method comprising:
- providing a housing that is flush and parallel to a surface;
- providing a fiber optic cable bundle that is connected to a lower end of the housing wherein the bundle has a terminal end;
- providing a support element connected to the housing to securely mount the housing in the surface;
- emanating light from the terminal end into a diffuser adjacent the terminal end of the bundle to shape, homogenize, and adjust the angle of the light passing therethrough; and
- sending the light through a transparent window layer over the diffuser to filter out particular wavelengths of light in order to produce a light output having a desired color.

10. A method comprising:
- providing an enclosure having an upper domed surface, a lower surface, and an internal cavity, wherein a recessed channel is formed in the upper domed surface through which light is emitted;
- providing a fiber optic cable bundle that is connected to the lower surface of the enclosure;
- coupling a light transformer to the cable bundle within the enclosure;
- positioning a mirror within the cavity, wherein the mirror defines a reflective plane facing the transformer; and
- actuating an adjustment mechanism coupled to a portion of the mirror so as to manipulate the position of the mirror.

* * * * *